United States Patent
Okura et al.

(10) Patent No.: US 9,879,500 B2
(45) Date of Patent: Jan. 30, 2018

(54) WELL TREATMENT METHOD BY DISINTEGRATING ELASTIC MATERIAL BY CONTACTING SEAL MEMBER FOR DOWNHOLE TOOLS COMPRISING ELASTIC MATERIAL WITH WELL TREATMENT FLUID

(71) Applicant: Kureha Corporation, Tokyo (JP)

(72) Inventors: Masayuki Okura, Tokyo (JP); Takeo Takahashi, Tokyo (JP); Takuma Kobayashi, Tokyo (JP)

(73) Assignee: KUREHA CORPORATION, Tokyo (JP)

( * ) Notice: Subject to any disclaimer, the term of this patent is extended or adjusted under 35 U.S.C. 154(b) by 0 days.

(21) Appl. No.: 15/123,823

(22) PCT Filed: Mar. 4, 2015

(86) PCT No.: PCT/JP2015/056417
§ 371 (c)(1),
(2) Date: Sep. 6, 2016

(87) PCT Pub. No.: WO2015/133543
PCT Pub. Date: Sep. 11, 2015

(65) Prior Publication Data
US 2017/0015900 A1 Jan. 19, 2017

(30) Foreign Application Priority Data
Mar. 7, 2014 (JP) .................. 2014-044610

(51) Int. Cl.
*E21B 33/12* (2006.01)
*F16J 15/10* (2006.01)
*C09K 8/72* (2006.01)

(52) U.S. Cl.
CPC ............ *E21B 33/12* (2013.01); *C09K 8/72* (2013.01); *F16J 15/102* (2013.01)

(58) Field of Classification Search
CPC ........ E21B 33/12; E21B 33/134; E21B 43/26; E21B 33/127; C09K 8/72; C09K 8/78; C09K 8/62; F16J 15/102
See application file for complete search history.

(56) References Cited

U.S. PATENT DOCUMENTS 9,057,260 B2 * 6/2015 Kelbie ................ E21B 43/103
2005/0205264 A1 9/2005 Starr et al.
(Continued)

FOREIGN PATENT DOCUMENTS

JP 3388144 B2 3/2003

OTHER PUBLICATIONS

Canadian Intellectual Property Office Examination Search Report for PCT/JP2015/056417 dated Apr. 27, 2017.
(Continued)

*Primary Examiner* — Michael R Wills, III
(74) *Attorney, Agent, or Firm* — Birch, Stewart, Kolasch & Birch, LLP

(57) ABSTRACT

A well treatment method characterized by disintegrating an elastic material by contacting a seal member for downhole tools comprising the elastic material with a well treatment fluid (acids such as hydrochloric acid, formic acid, acetic acid, and hydrofluoric acid, alkalis, hot water, steam, organic solvents, and the like).

9 Claims, 1 Drawing Sheet

(56) References Cited

U.S. PATENT DOCUMENTS

| | | | |
|---|---|---|---|
| 2005/0205266 | A1 | 9/2005 | Todd et al. |
| 2010/0132959 | A1 | 6/2010 | Tinker |
| 2010/0139930 | A1 | 6/2010 | Patel et al. |
| 2011/0048743 | A1 | 3/2011 | Stafford et al. |
| 2011/0067889 | A1* | 3/2011 | Marya .................. E21B 33/134 166/386 |
| 2011/0277989 | A1 | 11/2011 | Frazier |
| 2012/0181032 | A1 | 7/2012 | Naedler et al. |
| 2014/0190685 | A1* | 7/2014 | Frazier ................ E21B 33/1208 166/250.01 |
| 2015/0285026 | A1* | 10/2015 | Frazier ................ E21B 33/1291 166/120 |
| 2016/0258240 | A1* | 9/2016 | Fripp ...................... E21B 33/12 |
| 2016/0273299 | A1* | 9/2016 | Fripp ................... E21B 33/128 |

OTHER PUBLICATIONS

International Search Report PCT/JP2015/056417 dated May 26, 2015.
International Preliminary Report on Patentability for International Application No. PCT/JP2015/056417 dated Sep. 22, 2016.
Canadian Office Action dated Nov. 27, 2017 for Appl. No. 2,942,163.

* cited by examiner

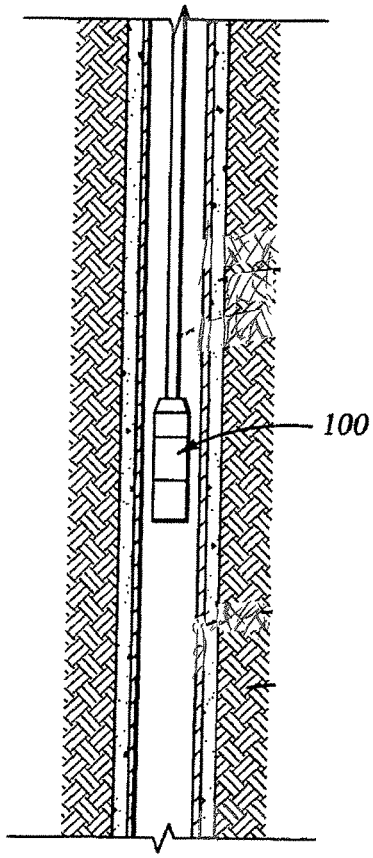
Fig. 1
Fig. 2
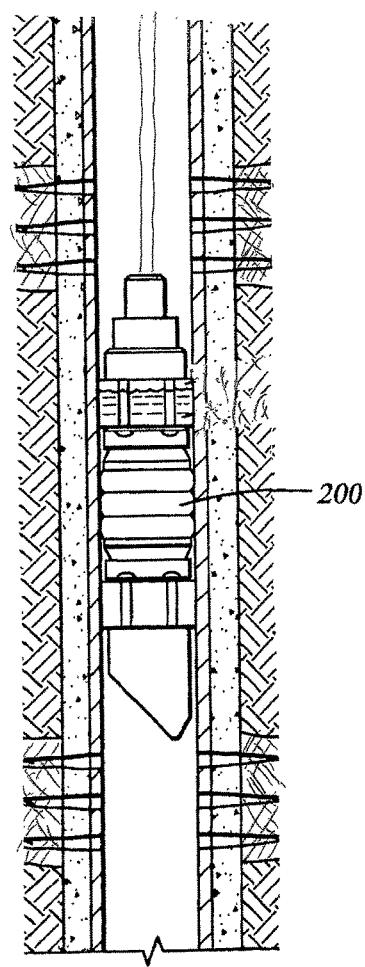

WELL TREATMENT METHOD BY DISINTEGRATING ELASTIC MATERIAL BY CONTACTING SEAL MEMBER FOR DOWNHOLE TOOLS COMPRISING ELASTIC MATERIAL WITH WELL TREATMENT FLUID

TECHNICAL FIELD

The present invention relates to a well treatment method in well drilling performed for producing hydrocarbon resources such as petroleum or natural gas, and specifically relates to a well treatment method accompanying release of a seal by a seal member for downhole tools comprising an elastic material.

BACKGROUND ART

Hydrocarbon resources such as petroleum or natural gas have come to be produced by excavation through wells (oil wells or gas wells, also collectively called "wells") having a porous and permeable subterranean formation. As energy consumption increases, deeper wells are being drilled, reaching depths greater than 9000 m worldwide and greater than 6000 m in Japan. In wells that are continuously excavated, the productive layer is stimulated in order to continuously excavate hydrocarbon resources efficiently from subterranean formations of which permeability has decreased over time and subterranean formations of which permeability has gradually become insufficient. Known stimulation methods include acid treatment and fracturing. Acid treatment is a method in which the permeability of the productive layer is increased by injecting a mixture of strong acids such as hydrochloric acid and hydrogen fluoride into the productive layer and dissolving the reaction components of bedrock (carbonates, clay minerals, silicates, and the like). However, various problems that accompany the use of strong acids have been identified, and increased costs, including various countermeasures, have also been pointed out. Thus, methods for forming fractures (also called "fracturing" or "hydraulic fracturing") in the productive layer using fluid pressure have received attention.

Hydraulic fracturing is a method in which fractures are generated in the productive layer by fluid pressure such as water pressure (also simply called "hydraulic pressure" hereinafter). Generally, a vertical hole is drilled, and then the vertical hole is curved and a horizontal hole is drilled in a subterranean formation several thousand meters underground. Fracturing fluid is then fed into these boreholes (meaning holes provided for forming a well, also called "downholes") at high pressure, and fractures and the like are produced by the hydraulic pressure in the deep subterranean productive layer (layer that produces the hydrocarbon resource such as petroleum or natural gas), and the productive layer is thereby stimulated in order to extract and recover the hydrocarbon resource through the fractures. The efficacy of hydraulic fracturing has also been examined for the development of unconventional resources such as shale oil (oil that matures in shale) and shale gas.

The following method is typically used to produce fractures and to perform the well treatment of perforation by hydraulic pressure in the productive layer of a deep subterranean formation (layer that produces the hydrocarbon resource such as petroleum such as shale oil or natural gas such as shale gas) using high-pressure fluid such as fracturing fluid. Specifically, a prescribed section of a borehole (downhole) drilled in a subterranean formation several thousand meters deep is partially plugged while isolating (also called "sealing") sequentially from the tip portion of the borehole, and fractures are produced or perforation is performed in the productive layer by feeding a fluid such as fracturing fluid at high pressure into the plugged section or using a tool containing an explosive compound such as a perforation gun. Then, the next prescribed section (typically ahead of the preceding section, i.e., a segment closer to the ground surface) is plugged, and fracturing and the like are performed, causing the fractures and perforations to advance. After that, this process is repeated until the required isolation, fracturing, and the like have been completed.

Stimulation of the productive layer is sometimes also performed again by fracturing not only for drilling of new wells but for desired sections of boreholes that have already been formed. In this case as well, the operations of borehole plugging, fracturing, and the like are similarly repeated. Additionally, there are also cases where, to perform finishing of the well, the borehole is plugged to block fluid from below, and after finishing of the top portions thereof is performed, the plugging is released.

A variety of downhole tools, which are tools used in a well to perform plugging and fracturing of a borehole, are known. For example, Patent Documents 1 to 3 disclose plugs (also called "frac plugs", "bridge plugs", "packers", and the like) which plug or fix a borehole by various members (various elements) being disposed on the periphery of a core metal.

Patent Document 1 discloses a degradable bridge plug in which a slip made of metal or a seal made of an elastic material is disposed on the outer circumferential surface of a mandrel. Patent Document 2 discloses a downhole tool such as a frac plug, bridge plug, or packer comprising a slip, sealing element, or the like on the outer circumferential surface of a body member, and further comprising a ball which is an unidirectional valve that prevents fluid from flowing through, and also discloses that the tool is degraded by a chemical solution. Patent Document 3 discloses a sleeve system (also called a "frac sleeve") in which fracture sleeve pistons, in which a passageway penetrates through the center part, are sequentially arranged so as to be movable in the axial direction of the sleeve, and sequential closed spaces are formed by ball sealers (also simply called "balls") and ball valve seats (also called "ball seats" or simply "seats").

Downhole tools used for well drilling are sequentially disposed in the borehole until the well is completed and need to have sealing performance such that they plug (seal) the prescribed sections inside the borehole against the fluid pressure for performing well treatments such as fracturing and perforation by high-pressure fluid. At the same time, the seal needs to be easy to release when the prescribed well treatment is completed and the subsequent well treatment is to be performed. Additionally, the seal needs to be released and the used downhole tools removed at the stage when production of petroleum such as shale oil or natural gas such as shale gas (hereinafter also collectively called "petroleum and natural gas" or "petroleum or natural gas") or the like is begun. Because a downhole tool such as a plug is typically not designed to be retrievable after use and release of plugging, it is removed by destruction or by making it into small fragments by milling, drill out, or another method, but substantial cost and time are required for milling, drill out, and the like. There are also plugs specially designed to be retrievable after use (retrievable plugs), but since plugs are placed deep underground, substantial cost and time are required to retrieve all of them.

Patent Document 1 discloses comprising a degradable member; and discloses being formed from a reactive metal selected from aluminum, calcium, and magnesium or an alloy of lithium, gallium, indium, or the like; and also discloses that a seal is formed by an elastic material capable of drill out. Patent Document 2 discloses a material composed of an epoxy, glass fibers, and the like as a tool degraded by a chemical solution. Additionally, Patent Document 4 discloses that a degradable polymer, such as aliphatic polyester, polycarbonate, or polyamino acid, in a downhole tool such as a plug or sleeve is degraded by a basic solution. Note that Patent Document 3 does not disclose that the frac sleeve is degradable.

Due to increased demand for securement of energy resources and environmental protection, particularly as excavation of unconventional resources expands, on the one hand, excavation conditions are becoming increasingly harsh, such as increased depth, while on the other hand, excavation is advancing under a diversity of excavation conditions, for example, a diversity of environmental conditions such as from temperatures lower than 60° C., e.g. 25° C., to high temperatures of approximately 200° C. attendant to the diversification of depth.

Specifically, downhole tools such as frac plugs, bridge plugs, packers, cement retainers, and sleeve systems (frac sleeves) need to have, on the one hand, mechanical strength (tensile strength and compression strength) to allow the material to be transported to a depth of several thousand meters underground, as well as oil resistance, water resistance, and heat resistance such that mechanical strength and the like are maintained even when they come in contact with the hydrocarbon resource to be recovered in the high-temperature and high-humidity environment of a deep subterranean downhole. Furthermore, downhole tool members provided in downhole tools need to have various characteristics such as sealing performance such that they can maintain plugging even against high-pressure hydraulic pressure by sealing fluid between the downhole tool and the inner wall of the borehole, specifically the casing disposed inside the borehole, when plugging the prescribed space of the downhole for performing perforation or fracturing.

At the same time, downhole tools and/or downhole tool members need to have the characteristic of being able to release the seal as necessary. Additionally, downhole tools and/or downhole tool members need to have the characteristics of being both easily removable and capable of improving production efficiency by completely releasing the fluid seal within a desired period under the environmental conditions of the well at the stage when the well for hydrocarbon resource recovery is completed (as described above, there are a diversity of environments such as temperature conditions attendant to diversification of depth). Thus, seal members for downhole tools directly involved in fluid sealing have also come to be designed in consideration of sealing performance and convenience of seal release at the same time.

That is, due to the fact that excavation conditions have become diverse such as increased depth, there is a need for a well treatment method that can decrease expense and shorten processes of well drilling by enabling design of the acceleration of release of a seal by a seal member for downhole tools as desire and the removal of downhole tools and the securement of flow paths as desire, which are performed in well treatment.

CITATION LIST

Patent Literature

Patent Document 1: US Patent Application Publication No. 2011/0048743 A1 specification
Patent Document 2: U.S. Pat. No. 7,168,494 specification
Patent Document 3: US Patent Application Publication No. 2010/0132959 A1 specification
Patent Document 4: US Patent Application Publication No. 2010/0273685 A1 specification

SUMMARY OF INVENTION

Technical Problem

An object of the present invention is, due to the fact that excavation conditions have become diverse such as increased depth, to provide a well treatment method that can decrease expense and shorten processes of well drilling by enabling design of the acceleration of release of a seal by a seal member for downhole tools as desire and the removal of downhole tools and the securement of flow paths as desire, which are performed in well treatment.

Solution to Problem

As a result of diligent research to solve the above problems, the present inventors discovered that the problems can be solved by optimizing the combination of elastic material and well treatment fluid, and thereby achieved the present invention.

Specifically, according to the present invention, a well treatment method by disintegrating an elastic material by contacting a seal member for downhole tools comprising an elastic material with a well treatment fluid is provided.

Additionally, as specific aspects of the invention according to the present invention, well treatment methods of (1) to (10) below are provided.
(1) The well treatment method, wherein the elastic material is at least one type selected from the group consisting of urethane rubber, acrylic rubber, polyester rubber, polyamide rubber, natural rubber, isoprene rubber, styrene rubber, butadiene rubber, and ethylene propylene rubber.
(2) The well treatment method, wherein the elastic material has a mass loss rate or a compression strength decrease rate after immersion for 24 hours in 150° C. water of not lower than 5%.
(3) The well treatment method, wherein the well treatment fluid comprises at least one type selected from the group consisting of acids, alkalis, hot water, steam, and organic solvents.
(4) The well treatment method, wherein the well treatment fluid comprises at least one type selected from the group consisting of hydrochloric acid, formic acid, acetic acid, and hydrofluoric acid.
(5) The well treatment method, wherein the seal member for downhole tools comprising an elastic material has hardness in the range of A60 to D80.
(6) The well treatment method, wherein the seal member for downhole tools comprising an elastic material is an annular molded article.
(7) The well treatment method, wherein the seal member for downhole tools comprising an elastic material is a ball or a ball seat.

(8) The well treatment method, wherein the seal member for downhole tools comprising an elastic material is provided in a plug for well drilling.

(9) The well treatment method, wherein the seal member for downhole tools comprising an elastic material comprises a reinforcing material.

(10) The well treatment method, wherein a downhole tool comprising a seal member for downhole tools comprising an elastic material comprises a degradable downhole tool member.

Advantageous Effects of Invention

According to the present invention, due to being a well treatment method characterized by disintegrating an elastic material by contacting a seal member for downhole tools comprising an elastic material with a well treatment fluid, there is the effect of providing a well treatment method that can decrease expense and shorten processes of well drilling by enabling design of acceleration of the release of the seal by a seal member for downhole tools as desire and the removal of downhole tools and the securement of flow paths as desire, which are performed in well treatment, based on the fact that excavation conditions have become diverse.

BRIEF DESCRIPTION OF DRAWINGS

FIG. 1 is a schematic, cross-sectional view depicting a downhole tool situated in a wellbore.

FIG. 2 is an enlarged cross-sectional side view of a wellbore having a downhole tool situated therein.

DESCRIPTION OF EMBODIMENTS

I. Seal Member for Downhole Tools Comprising Elastic Material

The well treatment method of the present invention is a well treatment method which releases a seal by a seal member for downhole tools comprising an elastic material.

1. Downhole Tool, Downhole Tool Member, And Well Treatment Downhole Tool

Examples of the downhole tool, in which the seal member for downhole tools to which the well treatment method of the present invention is applied, is provided, include frac plugs, bridge plugs, packers, sleeves, cement retainers, and the like which are known as plugs for well drilling, and the type, shape and size thereof are not particularly limited as long as it is a downhole tool which requires sealing when performing well treatment. FIG. 1 illustrates a downhole tool (100) situated in a wellbore.

For example, a tool suitable as the downhole tool is a plug for well drilling having a known structure comprising a mandrel which is a downhole tool member (either solid or having a hollow portion; also called "main body"), and other various downhole tool members placed on the outer circumferential surface orthogonal to the axial direction of the mandrel and at other locations.

Downhole Tool Member

Specific examples of downhole tool members other than the mandrel include, as previously described, diameter-expandable annular seal members that can seal fluid by plugging the spaces between a downhole tool (plug for well drilling) and the casing, and/or slips, wedges, rings, and other members that affix a diameter-expandable downhole tool (plug for well drilling) and the casing to each other, and downhole tools (plugs for well drilling) having a structure comprising known members. Thus, the well treatment method of the present invention is preferably applied to a well treatment method wherein the seal member for downhole tools comprising an elastic material is provided in a plug for well drilling. Furthermore, balls and ball seats which are incorporated into a plug for well drilling or are sometimes used independently qualify as downhole tool members.

As downhole tool members other than seal members for downhole tools provided in the downhole tool, for example, mandrels, slips, wedges, rings, and the like may be selected from a range of those having the materials, shapes, sizes, mechanical properties, and the like conventionally used for the relevant downhole tool member. For example, for a mandrel, it may have a hollow portion, and the diameter may vary along the axial direction, and it may have fixture parts, steps, indentations, protrusions, or the like on the outer surface. Similarly, the respective materials, shapes, sizes, mechanical properties and the like of the slips, wedges, rings, or the like as well as the combinations thereof may be selected as appropriate. Additionally, for example, as downhole tool members other than a seal member for downhole tools, for a mandrel or the like, one formed from a degradable material or soluble material may be used, and further, one formed from a material containing a reinforcing material may be used, and additionally, one formed from a composite with another member formed from another material may be used.

In particular, a well treatment method in which a downhole tool comprising a seal member for downhole tools comprising an elastic material comprises degradable downhole tool members is preferred because often, release of the seal by the seal member for downhole tools is accelerated and retrieval and removal of the downhole tool and/or downhole tool members is easy.

Well Treatment

The well treatments to which the well treatment method of the present invention is applied are various known well treatments performed using a well treatment fluid in well drilling. Examples include fracturing, perforation, finishing, and the like, and further include acid treatment, alkali treatment, hot water treatment, steam treatment, organic solvent treatment, and the like. The well treatment method of the present invention is not limited in the type of well treatment as long as it can disintegrate an elastic material by contacting a seal member for downhole tools comprising the elastic material with a well treatment fluid used in these well treatments.

2. Seal Member for Downhole Tools

The seal member for downhole tools in the seal member for downhole tools comprising an elastic material to which the well treatment method of the present invention is applied is a conventionally used seal member for downhole tools, and is not particularly limited. For example, the well treatment method of the present invention is applied to a well treatment method in which the seal member for downhole tools is a seal member in a sleeve system (frac sleeve); a seal member such as a ball valve or flapper valve within a downhole tool; a seal member that can temporarily block fluid by being disposed in openings between a downhole tool and the casing; and seal members in many other seal applications, such as sealing a borehole, in which the seal member is present in a form that protects and seals by covering metal downhole tool members by means of these metal portions expanding in diameter. FIG. 2 schematically depicts a wellbore having situated therein a downhole tool provided with a seal 200.

The well treatment method of the present invention is preferably applied as a well treatment method in which the seal member for downhole tools comprising an elastic material is an annular molded article, and is more preferably applied as a well treatment method in which the seal member is an annular molded article disposed on the outer circumferential surface orthogonal to the axial direction of a mandrel provided in a downhole tool. Additionally, the well treatment method of the present invention is preferably applied as a well treatment method in which the above seal member is a ball or a ball seat.

3. Elastic Material

The elastic material contained in the seal member for downhole tools comprising an elastic material to which the well treatment method of the present invention is applied is not particularly limited as long as the elastic material can be disintegrated by being contacted with a well treatment fluid, and an elastic material conventionally contained in a seal member for downhole tools may be used.

From the perspective of being able to disintegrate the above elastic material, normally, the elastic material contained in the seal member disappears and its shape disintegrates by decomposing or dissolving it by contacting with a well treatment fluid in a downhole environment, but additionally, as a result of the original strength of the elastic material decreasing and it becoming brittle due to a decrease in degree of polymerization or the like, it may simply disintegrate and lose its initial shape by application of a very small mechanical force. Specifically, it may have the characteristic of losing the sealing function required in a seal member for downhole tools by contacting with a well treatment fluid without a large mechanical force being applied.

From the perspective of reliable fluid sealing by a seal member for downhole tools and desired seal release in well treatment, the well treatment method of the present invention is preferably applied to a seal member for downhole tools in which the elastic material comprises at least one type selected from the group consisting of urethane rubber, acrylic rubber, polyester rubber, polyamide rubber, natural rubber, isoprene rubber, styrene rubber, butadiene rubber, and ethylene propylene rubber.

150° C. Mass Loss Rate or 150° C. Compression Strength Decrease Rate

Furthermore, from the perspective of being able to disintegrate the above elastic material and to perform the desired seal release while controlling disintegration as desired by contacting with a well treatment fluid in a downhole environment, the well treatment method of the present invention is preferably applied to a seal member for downhole tools comprising an elastic material that has a mass loss rate or a compression strength decrease rate after immersion for 24 hours in 150° C. water (respectively called "150° C. mass loss rate" or "150° C. compression strength decrease rate", and collectively "150° C. mass loss rate or compression strength decrease rate" hereinafter) of not lower than 5%.

To calculate the mass loss rate or compression strength decrease rate of an elastic material after immersion for 24 hours in 150° C. water, a sample prepared from an elastic material of a prescribed shape (for example, using a sample cut out to a size of 5 mm each in thickness, length, and width) is immersed in 400 mL of 150° C. water (deionized water or the like) and then removed after 24 hours, and by comparing the mass or the compressive strength of the sample measured after immersion to the mass (also called "initial mass" hereinafter) or the compressive strength (also called "initial compressive strength" hereinafter) of the sample measured in advance before immersion in 150° C. water, the loss rate (unit: %) relative to the initial mass or initial compressive strength is calculated. Note that when the elastic material sample degrades and leaches out and loses its shape or disappears while immersed in 150° C. water, the mass loss rate or compression strength decrease rate is taken to be 100%. Due to the fact that the elastic material has a 150° C. mass loss rate or compressive strength decrease rate, optimization of the combination of elastic material and well treatment fluid can control disintegration so that the elastic material contained in the seal member for downhole tools disintegrates within a wide range from several hours, several days, or several weeks in a downhole environment (attendant to diversification of depth, there are downhole environments at temperatures from less than 60° C. to approximately 200° C., as well as at low-temperatures of from 25 to 40° C. in recent years). Thus, it is possible to adjust the loss of sealing function of the seal member for downhole tools, which is preferred. Specifically, a seal member for downhole tools needs to have a diversity of sealing function maintenance time and function loss time according to the environment such as temperature of the downhole and according to the processes carried out in that environment. According to the well treatment method of the present invention, due to the fact that the seal member for downhole tools has a 150° C. mass loss rate or compression strength decrease rate of preferably not lower than 5%, more preferably not lower than 20%, even more preferably not lower than 50%, particularly preferably not lower than 80%, and most preferably 100%, it can have the characteristic of exhibiting a sealing function for a certain time and then losing the sealing function and releasing the seal in a variety of downhole temperature environments, such as 149° C., 121° C., 93° C., 80° C., or 66° C., as well as 25 to 40° C.

4. Other Blended Components

In the seal member for downhole tools to which the well treatment method of the present invention is applied, resin materials other than elastic materials and various additives such as stabilizers, degradation accelerators or degradation promoting agents, colorants, and reinforcing materials may be further contained or blended as other blended components within a range that does not hinder the object of the present invention. Examples of resin materials other than elastic materials include degradable resins such as aliphatic polyesters, nondegradable resins, nondegradable rubbers, and the like. The content of resin materials other than elastic materials and various additives is not particularly limited as long as it does not hinder the object of the present invention, but is normally from 0.1 to 150 parts by mass and often from 0.2 to 120 parts by mass relative to 100 parts by mass of the elastic material, and the optimal amount may be determined according to the types of resin material and various additives. In particular, the seal member for downhole tools comprising an elastic material may contain a reinforcing material.

Reinforcing Material

As reinforcing materials, materials such as resin materials conventionally used as reinforcing materials with the objective of improving mechanical strength or heat resistance may be used, and fibrous reinforcing materials or granular or powdered reinforcing materials may be used. The reinforcing materials may be contained typically in the amount of not greater than 150 parts by mass, and preferably in the range of 10 to 100 parts by mass, relative to 100 parts by mass of the elastic material. When the seal member for downhole tools comprising an elastic material contains a reinforcing material, it may be possible to reliably perform sealing for a desired period and to control disintegration of the seal member as desire by contacting it with a well treatment fluid even when the downhole environment is near the melting point of the elastic material.

Examples of fibrous reinforcing materials include inorganic fibrous substances such as glass fibers, carbon fibers, asbestos fibers, silica fibers, alumina fibers, zirconia fibers, boron nitride fibers, silicon nitride fibers, boron fibers, and potassium titanate fibers; metal fibrous substances such as stainless steel, aluminum, titanium, steel, and brass; and organic fibrous substances with a high melting point such as aramid fibers, kenaf fibers, polyamides, fluorine resins, polyesters, and acrylic resins; and the like. Short fibers having a length of not greater than 10 mm, more preferably 1 to 6 mm, and even more preferably 1.5 to 4 mm are preferable as the fibrous reinforcing materials. Furthermore, inorganic fibrous substances are preferably used, and glass fibers are particularly preferable.

As the granular or powdered reinforcing material, mica, silica, talc, alumina, kaolin, calcium sulfate, calcium carbonate, titanium oxide, ferrite, clay, glass powder (milled fiber or the like), zinc oxide, nickel carbonate, iron oxide, quartz powder, magnesium carbonate, barium sulfate, and the like can be used. These reinforcing materials may be each used alone or in combinations of two or more types. The reinforcing material may be treated with a sizing agent or surface treatment agent as necessary.

5. Seal Member for Downhole Tools

Hardness of Elastic Material

In the well treatment method of the present invention, it is preferred that the seal member for downhole tools comprising an elastic material has hardness in the range of A60 to D80 from the perspective of fully exhibiting the intrinsic sealing function that the seal member for downhole tools should exhibit. In the present invention, the hardness of the seal member means the hardness expressed as type A (also called "hardness A" hereinafter) or type D (also called "hardness D" hereinafter) of durometer hardness measured in accordance with ISO 7619. Types of durometer hardness include type A for medium hardness suitable for general rubbers and the like, type D for high hardness suitable for hard rubbers and the like, and type E for low hardness suitable for sponges and the like (for example, hardness A100 is often roughly equivalent to hardness D60). Due to the fact that the hardness of the seal member for downhole tools comprising an elastic material is in the range of A60 to D80, it can be configured so as to perform reliable borehole sealing that withstands high-pressure fluid pressurization of fracturing and the like by also adjusting the structure and the like of the seal member as desired. The hardness of the seal member for downhole tools comprising an elastic material is more preferably in the range of A65 to D78, and even more preferably A70 to D75.

Bending Modulus of Elasticity

From the perspective of reliably exhibiting a sealing function that a seal member for downhole tools should fundamentally exhibit in diverse downhole environments, the seal member for downhole tools comprising an elastic material to which the well treatment method of the present invention is applied may have a bending modulus of elasticity at 23° C. from 0.02 to 10 GPa, as desire. If the bending modulus of elasticity at 23° C. of the seal member for downhole tools is in the range from 0.02 to 10 GPa, when plugging a borehole in a downhole environment of temperature 149° C., 121° C., 93° C., 80° C., or 66° C., as well as 25 to 40° C., for example, when sealing a fluid between the downhole tool and the casing, the seal member for downhole tools can deform so as to securely fit to the shape of the downhole tool and the shape of the casing because the bending modulus of elasticity of the seal member for downhole tools decreases to an appropriate degree in that downhole environment. Thus, the contact area between the seal member for downhole tools and the casing is large and plugging is reliable. Additionally, there is the effect that the fluid seal is difficult to break even if extremely high pressure is applied by fluid for implementing a treatment that requires sealing such as fracturing. The bending modulus of elasticity at 23° C. is measured in accordance with JIS 7113 (corresponding to ISO 178).

From the perspective of being easily deformable to assure a sealing function in a downhole environment, the bending modulus of elasticity at 23° C. of the seal member for downhole tools is preferably not greater than 9 GPa, more preferably not greater than 8 GPa, and even more preferably not greater than 7 GPa, which is effective particularly in seal members greater than 5 mm thick. When the bending modulus of elasticity at 23° C. of the seal member for downhole tools is too low, it deforms and the seal ends up being destroyed when high fluid pressure is applied. Thus, it is preferably not less than 0.025 GPa, more preferably not less than 0.03 GPa, and even more preferably not less than 0.05 GPa.

Tensile Fracture Strain

Furthermore, from the perspective of reliably exhibiting a sealing function in a downhole environment, the seal member for downhole tools comprising an elastic material to which the well treatment method of the present invention is applied may have a tensile fracture strain of not less than 20% in the downhole environment, as desire. As long as the tensile fracture strain of the seal member for downhole tools is not less than 20%, when a borehole is to be plugged, for example, when fluid is to be sealed between a downhole tool and the casing, there is no risk of the seal member for downhole tools breaking even if it is deformed so as to reliably fit to the shape of the downhole tool and the shape of the casing, and specifically, even if it is deformed while incurring large tensile force or compressive force. Thus, the contact area of the seal member for downhole tools and the casing is large, resulting in reliable plugging. Additionally, there is the effect that the fluid seal is difficult to break even if it incurs large tensile force or compressive force due to extremely high pressure being applied by fluid for implementing a treatment that requires sealing such as fracturing. Tensile fracture strain is measured according to ISO 527 at a prescribed temperature corresponding to the desired downhole environment, for example, 149° C., 121° C., 93° C., 80° C., or 66° C., as well as 25 to 40° C.

From the perspective of being easily deformable to assure a sealing function in a downhole environment, the tensile fracture strain of the seal member for downhole tools is preferably not less than 30%, and more preferably not less than 40%. The tensile fracture strain of the seal member for downhole tools does not have a particular upper limit, but is normally not greater than 1000% and often not greater than 900% because if the tensile fracture strain is too high, the seal member for downhole tools may not easily break into small fragments when it is degraded and loses strength. Furthermore, when the seal member for downhole tools is thin, for example, not greater than 10 mm thick, it can sometimes be used even when the tensile fracture strain is less than 20%, for example, not less than 10%.

Shape and Size of Seal Member for Downhole Tools

The shape and size of the seal member for downhole tools comprising an elastic material to which the well treatment method of the present invention is applied are not particularly limited, and may be adjusted so as to be compatible with the type, shape, and size of the downhole tool comprising the seal member for downhole tools. For example, it may have a shape such as a sheet shape (thin film shape, thick plate shape, and the like), rod shape (round rod shape, square pillar shape, and the like), rectangular shape (including a cuboid shape), ball shape, or other lump shape (regular shape, irregular shape, and the like). When the seal member for downhole tools comprising an elastic material to which the well treatment method of the present invention is applied is sheet-shaped or is a sealing material or packing material (for packing), it does not necessarily need to be a molded article having a certain shape. Furthermore, when the downhole tool comprising the seal member for downhole tools to which the well treatment method of the present invention is applied is a plug for well drilling or the like, it may be a seal member for downhole tools that is an annular molded article as described above, and more specifically, it may be a seal member for downhole tools in which an annular molded article is disposed on an outer circumferential surface orthogonal to the axial direction of a mandrel provided in the downhole tool, or it may be a seal member for downhole tools provided in a plug for well drilling such as a frac plug or bridge plug. The size of the seal member is normally not greater than 500 mm, preferably not greater than 250 mm, and more preferably not greater than 150 mm. In addition, as similarly described above, the well treatment method of the present invention is preferably applied as a well treatment method in which the above seal member is a ball or ball seat, and the diameter of the ball is normally from 20 to 200 mm, preferably from 30 to 170 mm, more preferably from 50 to 150 mm, and even more preferably from 70 to 120 mm.

6. Method for Manufacturing Seal Member for Downhole Tools

The method for manufacturing the seal member for downhole tools comprising an elastic material to which the well treatment method of the present invention is applied is not particularly limited. For example, a molded product of a prescribed shape is molded by injection molding, extrusion molding (including solidification-and-extrusion molding), centrifugal molding, compression molding, or other known molding methods using a composition comprising a prescribed amount of an elastic material and other blended components included as desired as a molding starting material, or, premolded products of appropriate shapes (for example, a rod, thick plate, or the like) are molded, and after machining such as cutting or perforating as necessary, they may be combined by known methods to produce a seal member for downhole tools comprising an elastic material.

II. Disintegration of Elastic Material by Contacting with Well Treatment Fluid

The well treatment method of the present invention is characterized by disintegrating an elastic material by contacting a seal member for downhole tools comprising the elastic material with a well treatment fluid.

1. Well Treatment Fluid

In the well treatment method of the present invention, as the well treatment fluid that is made to contact the seal member for downhole tools comprising an elastic material, the most appropriate well treatment fluid may be selected from various well treatment fluids used in well treatment described above in consideration of the combination of well treatment fluid and elastic material and the combination of well treatment fluid and downhole environment such as temperature.

From the perspective of controlling disintegration of the elastic material by contacting the seal member for downhole tools comprising an elastic material with a well treatment fluid in a downhole environment and releasing the seal, the well treatment fluid preferably comprises at least one type selected from the group consisting of acids, alkalis, hot water, steam, and organic solvents. As the acid, alkali, hot water, steam, or organic solvent, the optimal substance may be selected in consideration of the elastic material, the downhole environment, and the like from those used by being contained in well treatment fluid. For example, as acids, those having a pH of not greater than 6.5 and preferably not greater than pH 6 may be used, and the well treatment fluid preferably contains at least one type selected from the group consisting of hydrochloric acid, formic acid, acetic acid, and hydrofluoric acid. As alkalis, those having a pH of not less than 7.5 and preferably not less than pH 10 may be used. As hot water, that having a temperature of not lower than 25° C., in most cases not lower than 50° C., and additionally not lower than 90° C., may be used. As organic solvents, generally used organic solvents such as toluene and xylene may be used, and sometimes oils (aliphatic hydrocarbons) may be used.

2. Disintegration of Elastic Material

In the well treatment method of the present invention, the seal member for downhole tools comprising an elastic material can lose its sealing function and can release the seal due to degradation of the elastic material within several hours to several weeks by contacting with a well treatment fluid in a downhole environment (attendant to diversification of depth, there are downhole environments often at temperatures from 60° C. (140° F.) to 204° C. (400° F.), and at low temperatures of approximately 25 to 40° C. in recent years). Thus, the substantial expense and time conventionally required for retrieving or physically destroying a member for downhole tools for the purpose of releasing the seal of a space between a downhole tool such as a plug for well drilling and the casing become unnecessary, and it can contribute to decreasing expense and shortening of processes for recovery of hydrocarbon resources. Additionally, when the downhole tool comprising the seal member for downhole tools comprising an elastic material of the present invention comprises a degradable downhole tool member, the operation of retrieving or physically destroying the member for downhole tools becomes completely unnecessary. The downhole tool such as a plug for well drilling comprising the seal member for downhole tools comprising an elastic material to which the well treatment method of the present invention is applied needs to have a diversity of performance (such as strength) maintenance time and degradation time according to the downhole environment such as various temperatures and according to the processes carried out in that environment. The seal member for downhole tools comprising an elastic material to which the well treatment method of the present invention is applied can have the characteristic of maintaining a sealing function for a certain time and then losing the sealing function and releasing the seal in a variety of downhole temperature environments, such as 149° C., 121° C., 93° C., 80° C., or 66° C., as well as 25 to 40° C. In the seal member for downhole tools comprising an elastic material to which the well treatment method of the present invention is applied, the factors that control the sealing function maintenance time or speed at which the sealing function is lost and the degree to which they can be controlled differ depending on the combination of types of elastic material and polymer material, and can be adjusted by various techniques.

3. Specific Example of Disintegration of Elastic Material

By contacting the seal member for downhole tools comprising an elastic material with a well treatment fluid, the elastic material can be disintegrated, as can be ascertained by the following specific examples.

Disintegration of Thermosetting Urethane Rubber at 66° C.

A sample of thermosetting urethane rubber (hardness A90; prepared by cutting out to length, width, and thickness 10 mm each; similarly hereinafter) was immersed in various 66° C. fluids (equivalent to well treatment fluids) and then removed after a prescribed time. The sample was washed with water and its surface state was observed visually. The results of observing the surface state for each liquid are as follows.

1) Deionized water: No change in the surface was seen after immersion for 168 hours (7 days).
2) 3 mass % hydrochloric acid aqueous solution: Whitening originating from degradation was observed on the surface of the sample after immersion for 168 hours (7 days).
3) 15 mass % hydrochloric acid aqueous solution: Whitening originating from degradation was observed on the surface of the sample after immersion for 13 hours, but after immersion for 24 hours (1 day), it was observed that the sample surface degraded and lost strength and broke into pieces with application of slight force. After immersion for 72 hours (3 days), the sample lost strength and disintegrated almost entirely, and after immersion for 168 hours (7 days), it was ascertained that it completely lost strength and broke into pieces.
4) 3 mass % potassium chloride aqueous solution: No change in the surface was seen after immersion for 168 hours (7 days).
5) pH 11 alkaline aqueous solution: No change in the surface was seen after immersion for 168 hours (7 days).

From the above facts, it was understood that for the elastic material of thermosetting urethane rubber, the elastic material can be disintegrated in a 66° C. downhole environment by contacting the seal member for downhole tools comprising the elastic material with a well treatment fluid containing acid, and disintegration can be controlled by adjusting the acid concentration (that is, adjusting the pH).

Disintegration of Nitrile Rubber at 66° C.

For a nitrile rubber sample (hardness A45), the results of observing the surface state for each liquid visually are as follows.

1) Deionized water: No change in the surface was seen after immersion for 168 hours (7 days).
2) 3 mass % hydrochloric acid aqueous solution: No change in the surface was seen after immersion for 168 hours (7 days).
3) 15 mass % hydrochloric acid aqueous solution: No change in the surface was seen after immersion for 168 hours (7 days).
4) 3 mass % potassium chloride aqueous solution: No change in the surface was seen after immersion for 168 hours (7 days).
5) pH 11 alkaline aqueous solution: No change in the surface was seen after immersion for 168 hours (7 days).

From the above facts, it was understood that for the elastic material of nitrile rubber, the elastic material cannot be disintegrated in a 66° C. downhole environment by contacting the seal member for downhole tools comprising the elastic material with a well treatment fluid containing acid or alkali.

Disintegration of Thermosetting Urethane Rubber at 93° C.

A sample of thermosetting urethane rubber (hardness A90) was immersed in 93° C. 3 mass % hydrochloric acid aqueous solution and then removed after a prescribed time. The sample was washed with water and its surface state was observed visually. Whitening originating from degradation was observed on the surface of the sample after immersion for 13 hours, and since the mass of the removed sample had decreased to 97.7% of its initial mass, it was ascertained that disintegration of the sample surface had proceeded. Furthermore, when the whitened portion of the removed sample surface was chipped with a knife and hardness was measured, hardness of A90 was maintained and there was no change in physical properties of the interior of the sample, and it was understood that the disintegration of the sample was surface disintegration. Also, after this sample was immersed for 72 hours (3 days), it was observed that the sample degraded and lost strength and broke into pieces, and the mass of the removed sample had decreased to 30.0% of the initial mass. Additionally, after it was immersed for 168 hours (7 days), it was observed that the sample degraded and lost strength and broke into pieces, and the mass of the removed sample had decreased to 27.9% of the initial mass.

From the above facts, it was found that for the elastic material of thermosetting urethane rubber, the elastic material can be disintegrated by contacting the seal member for downhole tools comprising the elastic material with a well treatment fluid containing acid and disintegration can be controlled by adjusting the concentration of the acid (that is, adjusting the pH) in the well treatment fluid in accordance with fluctuations in downhole environment (temperature).

Combinations of Other Elastic Materials and Well Treatment Fluids

Similarly, it was found that for a seal member for downhole tools comprising acrylic rubber or polyester rubber as an elastic material, disintegration of the seal member can be controlled by contacting it with a well treatment fluid containing acid, alkali, hot water, steam, or an organic solvent (toluene). Furthermore, it was found that for a seal member for downhole tools comprising polyamide rubber as an elastic material, the elastic material can be disintegrated and disintegration can be controlled by contacting the member with a well treatment fluid containing hot water or steam.

Additionally, it was found that the elastic material can be disintegrated and disintegration can be controlled in a seal member for downhole tools comprising natural rubber by contacting the member with a well treatment fluid containing an acid or an organic solvent, and in a seal member for downhole tools comprising isoprene rubber, styrene rubber, or butadiene rubber, by contacting the member with a well treatment fluid containing an organic solvent. Furthermore, it was found that for a seal member for downhole tools comprising ethylene propylene rubber, the elastic material cannot be disintegrated by contacting the member with a well treatment fluid containing an acid or an organic solvent (toluene), and the elastic material can be disintegrated using an oil (aliphatic hydrocarbon).

From these facts, it was found that, according to the well treatment method of the present invention, it is possible to select and adjust whether the elastic material disintegrates (degrades, or the like) and the degree thereof according to the combination of the type of elastic material and the well treatment fluid and also according to the downhole environment (for example, the temperature) in which the seal member for downhole tools comprising an elastic material and the well treatment fluid are put in contact, and as a result, it is possible to control, as desired, the release of the seal by the seal member for downhole tools comprising an elastic material carried out in the well treatment.

III. Well Treatment Method and Well Drilling Method

According to the well treatment method of the present invention characterized by disintegrating an elastic material by contacting a seal member for downhole tools comprising the elastic material with a well treatment fluid, in a well drilling method in which fluid between the downhole tool and the casing is sealed using a seal member for downhole tools comprising an elastic material to which the well treatment method is applied, specifically, using a downhole tool such as a plug for well drilling comprising the seal member for downhole tools, sealing (plugging) of the borehole (downhole) can be performed by the seal member for downhole tools comprising an elastic material in order to perform a prescribed well treatment that uses a well treatment fluid, and also, the elastic material can be disintegrated by contacting the seal member with the well treatment fluid and the disintegration thereof can be controlled. Thus, selecting the optimal combination of elastic material and well treatment fluid according to the downhole environment enables design so that the seal by the seal member for downhole tools that plugs the borehole can be easily released within a desired period in that downhole environment. As a result, according to the well drilling method comprising the well treatment method of the present invention, the substantial cost and time conventionally required for the operation of destroying the sealing function for releasing the seal and to destroy or fragmentize, by pulverization, perforation, or another method, the many members remaining inside a well after the well treatment is completed or the completion of the well become unnecessary, which makes it possible to reduce the expense and shorten the processes of well drilling.

Thus, according to the well drilling method comprising the well treatment method of the present invention, there are the following advantages: (i) the seal for preventing movement of fluid inside the well can be released within a desired period; (ii) unnecessary downhole tools that hinder production are easy to remove; (iii) a downhole tool that does not require crushing treatment of the downhole tool or downhole tool member before the start of production is obtained due to the fact that other downhole tool members provided in the downhole tool are formed from a degradable material; and (iv) it can be applied to various downhole tools used in a diversity of processes in which any sort of sealing is required, without limitation to downhole tools used in fracturing processes.

INDUSTRIAL APPLICABILITY

The present invention, due to being a well treatment method characterized by disintegrating an elastic material by contacting a seal member for downhole tools comprising an elastic material with a well treatment fluid, can provide a well treatment method that can decrease expense and shorten processes of well drilling by enabling design of acceleration of the release of the seal by a seal member for downhole tools as desire and the removal of downhole tools and the securement of flow paths as desire, which are performed in well treatment, based on the fact that excavation conditions have become diverse. Thus, its industrial applicability is high.

The invention claimed is:

1. A method for releasing a seal for a downhole tool disposed within a wellbore, said method comprising:
   contacting a seal member comprising an elastic material with a fluid existing in the wellbore, wherein the elastic material is at least one type selected from the group consisting of urethane rubber, acrylic rubber, polyester rubber, polyamide rubber, natural rubber, isoprene rubber, styrene rubber, butadiene rubber, and ethylene propylene rubber; and
   disintegrating the elastic material,
      wherein the downhole tool is a tool for sealing the wellbore and comprises the seal member, and
      wherein the elastic material has a mass loss rate or a compression strength decrease rate after immersion for 24 hours in 150° C. water of not less than 5%.

2. The well treatment method according to claim 1, wherein the well treatment fluid comprises at least one type selected from the group consisting of acids, alkalis, hot water, steam, and organic solvents.

3. The well treatment method according to claim 1, wherein the well treatment fluid comprises at least one type selected from the group consisting of hydrochloric acid, formic acid, acetic acid, and hydrofluoric acid.

4. The well treatment method according to claim 1, wherein the seal member for downhole tools comprising an elastic material has hardness in the range of A60 to D80.

5. The well treatment method according to claim 1, wherein the seal member for downhole tools comprising an elastic material is an annular molded article.

6. The well treatment method according to claim 1, wherein the seal member for downhole tools comprising an elastic material is a ball or a ball seat.

7. The well treatment method according to claim 1, wherein the seal member for downhole tools comprising an elastic material is provided in a plug for well drilling.

8. The well treatment method according to claim 1, wherein the seal member for downhole tools comprising an elastic material comprises a reinforcing material.

9. The well treatment method according to claim 1, wherein a downhole tool comprising a seal member for downhole tools comprising an elastic material comprises a degradable downhole tool member.

* * * * *